United States Patent
Brunella (10) Patent No.: US 9,845,908 B2
(45) Date of Patent: Dec. 19, 2017

(54) LIGHTWEIGHT QUICK CONNECTOR SYSTEM

(71) Applicant: Alfred J. Brunella, Long Beach, CA (US)

(72) Inventor: Alfred J. Brunella, Long Beach, CA (US)

(73) Assignee: AP Couplings, Inc., Vermillion, OH (US)

(*) Notice: Subject to any disclaimer, the term of this patent is extended or adjusted under 35 U.S.C. 154(b) by 0 days.

(21) Appl. No.: 14/675,732

(22) Filed: Mar. 31, 2015

(65) Prior Publication Data

US 2016/0290541 A1  Oct. 6, 2016

(51) Int. Cl.
*F16L 25/14*  (2006.01)
*F16L 37/14*  (2006.01)
*F16L 15/00*  (2006.01)
*F16L 25/00*  (2006.01)

(52) U.S. Cl.
CPC ............ *F16L 37/144* (2013.01); *F16L 25/14* (2013.01); *F16L 15/006* (2013.01); *F16L 25/009* (2013.01)

(58) Field of Classification Search
CPC ...... F16L 37/0841; F16L 37/088; F16L 21/08
USPC .................................................. 285/305, 321
See application file for complete search history.

(56) References Cited

U.S. PATENT DOCUMENTS

| | | | | |
|---|---|---|---|---|
| 2,440,452 A | * | 4/1948 | Smith | F16L 37/088 |
| 3,151,891 A | * | 10/1964 | Sanders | F16L 37/088 |
| 3,154,327 A | * | 10/1964 | Rothschild | F16L 37/144 |
| 3,314,696 A | * | 4/1967 | Ferguson | F16L 37/088 |
| 3,450,424 A | * | 6/1969 | Calisher | F16L 37/088 |
| 4,186,946 A | * | 2/1980 | Snow | F16L 37/088 |
| 4,244,608 A | * | 1/1981 | Stuemky | F16L 37/144 285/305 |
| 4,640,534 A | * | 2/1987 | Hoskins | F16L 37/088 |
| 4,707,000 A | * | 11/1987 | Torgardh | F16L 37/088 |
| 4,884,829 A | * | 12/1989 | Funk | F16L 37/088 |
| 4,923,350 A | | 5/1990 | Hinksman | |
| 5,261,438 A | * | 11/1993 | Katchka | F16L 37/088 |
| 5,265,652 A | | 11/1993 | Brunella | |
| 5,341,773 A | * | 8/1994 | Schulte | F02D 9/105 |
| 5,472,242 A | * | 12/1995 | Petersen | F16L 37/088 |
| 5,490,694 A | * | 2/1996 | Shumway | F16L 37/088 |
| 5,749,606 A | * | 5/1998 | Lu | F16L 37/088 |

(Continued)

FOREIGN PATENT DOCUMENTS

EP  0 302 674 A1  2/1989

OTHER PUBLICATIONS

Patent History of European Patent No. 0 302 674 A1, Feb 8, 1989.

(Continued)

*Primary Examiner* — David E Bochna
(74) *Attorney, Agent, or Firm* — Curtis L. Harrington; Harrington & Harrington (57) ABSTRACT

A lightweight quick connector system that is a more unitized, installation and dismantling structure and method for joining the ends of straight grooved pipe that uses o-ring fluid sealing. The connector system includes a grooved pipe receiving structure for support and stabilization of the o-ring sealing structure. The quick connector system also has the capability to operate as a size adapter for grooved pipe of different sizes and has the capability to act as a fitting adapter to enable interfitting of a grooved pipe to another size and type of pipe.

1 Claim, 7 Drawing Sheets

(56) References Cited

U.S. PATENT DOCUMENTS

| | | | | |
|---|---|---|---|---|
| 5,876,071 | A * | 3/1999 | Aldridge | F16L 37/088 |
| 5,979,946 | A * | 11/1999 | Petersen | F16L 37/088 |
| 6,102,447 | A * | 8/2000 | Aldridge | F16L 37/088 |
| 6,331,020 | B1 | 12/2001 | Brunella | |
| 6,386,596 | B1 * | 5/2002 | Olson | F16L 37/0925 |
| 6,474,698 | B2 * | 11/2002 | Dobler | F16L 37/088 |
| 6,554,322 | B2 * | 4/2003 | Duong | F24H 9/2035 |
| 7,273,237 | B1 * | 9/2007 | Plattner | F16L 37/088 |
| 7,438,328 | B2 * | 10/2008 | Mori | F16L 37/088 |
| 7,699,356 | B2 * | 4/2010 | Bucher | F16L 37/088 |
| 7,950,699 | B2 * | 5/2011 | Bauer | F16L 37/088 |
| 8,146,956 | B2 * | 4/2012 | Chaupin | F16L 37/088 285/305 |
| 8,613,473 | B2 * | 12/2013 | Spielmann | F16L 37/144 285/307 |
| 8,851,526 | B2 * | 10/2014 | Taylor | F16L 37/088 |
| 9,273,812 | B2 * | 3/2016 | Bassaco | F16L 37/08 |
| 2010/0015606 | A1 * | 1/2010 | Davies | B01F 13/0071 |
| 2011/0067225 | A1 * | 3/2011 | Bassaco | F16D 25/08 29/525.01 |

OTHER PUBLICATIONS

Presentation of Apr. 2013 by Gary Nauer entitled "Stapleless Coupler Development" 30 page PDF discloses coupler specifications.

Internet snapshot, 2 pages Parker Steck-O Adapter.

\* cited by examiner

LIGHTWEIGHT QUICK CONNECTOR SYSTEM

BACKGROUND OF THE INVENTION

Field of the Invention

The present invention relates to high reliability lightweight quick connector system that utilizes a locking clip having curved section members for increased locking groove engagement of grooved pipe and that will save time in piping installations, especially water piping service replacing the rubber and opposing coupling systems currently used for such water distribution.

Description of the Prior Art

An industrial standard for water pipe service runs in an industrial facility has involved the use of cut groove steel and other iron pipe size "IPS" piping. Generally, for a nominal size standard, the pipe, regardless of the alloys, and for each nominal size, there is a given outside diameter that's standard, with the outside diameter never changing, but with the wall thickness and inner diameter changing for different types and materials from which the pipe is made, but generally a pipe's outer diameter does not change for that pipe's nominal outer diameter size. Standard cut groove size, dimensions and specifications for grooved pipe may be found at a variety of references. For one example for illustration only, in two inch diameter pipe, a groove width of about 0.313 inches and at a depth of about 0.063 inches is placed about 0.625 inches from the end of the pipe. Where the flow path at two ends of such pipe are to be made continuous, a method of joining has been conventionally provided as part of a grooved pipe system.

A connection between two ends of this grooved pipe is typically accomplished by providing an annular rubber sleeve having an internal land circumferentially inward about its inner periphery. When two ends of the grooved pipe are brought together, they are supported, aligned and then inserted into the annular rubber sleeve seal with each pipe's end surface urged against a lateral side of the internal land. A pair of heavy half circle "U" shaped couplings, also known as a split double bolt clamp, are provided to overfit and compress the exterior of the annular rubber sleeve seal and engage the adjacent grooves of the two ends of the grooved pipe.

The pair of heavy half circle "U" shaped couplings have a cross sectional wide shallow "u" profile that envelops and compresses the annular rubber sleeve seal as the outer rims of the heavy half circle "U" shaped couplings begin engaging the grooves adjacent the ends of the pipe. Each of the pair of heavy half circle "U" shaped couplings have aligning apertures adjacent their opposite ends so that large threaded bolts can be used to extend through the aligning apertures and by engagement of a nut on the threaded bolt compress the couplings toward each other and around the grooved pipe using wrenches. Proper compression can possibly achieve a configuration where the internal land hopefully completely evenly enters into the area between the pipe ends where it may be compressed between the ends of the grooved pipe. The fittings also presses portions of the annular rubber sleeve seal on opposite sides of the land against the outer surface of the grooved pipe at an area between the groove and end of each pipe. The above details of joining and sealing may be referred to as the "prior seal and coupling system".

The amount of labor and cost of material for using this prior seal and coupling system are significant. As the pipe flow paths are being extended or constructed throughout a facility, lengths of pipe, seals and couplings must be used periodically along the flow paths in order to complete the construction.

The time and effort in constructing the "prior seal and coupling system" is significant. Supporting and aligning the pipe segments, putting the two adjacent ends of the grooved pipes to be joined into the relatively tight fitting double seal, then bringing the pair of heavy half circle "U" shaped couplings together around the made up ends of the engaged double seal and the grooves in the pipe ends, threading bolts through apertures in the pair of heavy half circle "U" shaped couplings, attaching the tightening nuts to the bolts and then carefully and evenly tightening both sides of the pair of heavy half circle "U" shaped couplings to make sure that the sides compress evenly and that the double seal is evenly compressed, takes a significant amount of time. Ideally each bolt on either side of a coupler must be turned only slightly at a time so that the coupler will come together evenly.

Multiplying the construction time expenditure for each of the junctions in the water distribution piping system using the "prior seal and coupling system" creates a significant addition to any piping total project expenditure. The "prior seal and coupling system" is of necessity a significant addition of weight and cost. The coupling alone may weigh 2 or 3 pounds. In many cases it requires two workers, with one to manipulate or hold the non connected pipe section and another to fit the seal and assemble the seal compressing and pipe groove engaging coupler around the seal and pipe ends and tighten to the recommended strength.

Reliability is another issue with the "prior seal and coupling system". After a water distribution system it is typically statically tested. Leaks require repair, and the labor intensive painstaking, time consuming process the occurred in making a connection must be reversed in order to try to ascertain any leakage problem. In many cases the problem may have been uneven tightening. Uneven tightening is cured by re-assembling the joint but with greater care.

Another problem with the "prior seal and coupling system" is the provision of so many sealing structures and forces that must be coordinated to give a good and positive seal. Each connection involves the face of the connected pipes against the internal land, and also a band compressed against the exterior of the pipe between the face of the connected pipes and their respective grooves. The coupling member is meant to engage the two grooves simultaneously in a way that urges the pipes against the internal land in one direction and which compresses the circular bands sealing member of the seal compressed against the exterior of the pipe between the face of the connected pipes. Mismatch of these two simultaneous forces are often possible if the coupler is not assembled mindfully. The care with which the coupler must be assembled and engaged can contribute to leakage failure, even if it is temporary and repairable with further expenditure of time and labor.

Any solution which can significantly reduce cost and at the same time enable installations to be built with fewer workers would provide a significant advantage, particularly since grooved pipe systems are used for relatively low pressure service, including water sprinkler systems and water supply service and the like. What is needed is a structure and method that will enable a less expensive process of assembling a grooved pipe system and which will enable the work to be done with fewer workers and in some cases a single worker.

SUMMARY OF THE INVENTION

Accordingly, it is the general purpose and object of the present invention to provide a lightweight quick connector system that is simpler, easier to handle, time saving structure and method for joining the ends of grooved pipe. A body on one side carries an opening having a diameter bore that is slightly larger than the outer diameter of the grooved pipe. The bore of the body carries an internal groove more distal from the end opening for fitting an o-ring sealing member to seal against the exterior of the grooved pipe between the end and the groove. The body also has a pair of splits, or slots to admit a locking clip which has curved section members for increased locking engagement of the pipe groove that is spaced apart from the end of the grooved pipe. The other side of the quick connector can be a flange, another body, or a threaded connector or any other type of structure that promotes connection and fluid flow, including NPT, MPSH and NH threads.

The result is a lightweight quick connector system connection body that can be: lightweight and have enough of an extension that the grooved pipe is angularly supported as it is guided into the quick connector; can provide a positive o-ring seal; a positive clip locking mechanism; and joinder and disconnectivity in a matter of seconds rather than five or ten minutes required for the "prior seal and coupling system." In terms of troubleshooting, the lightweight quick connector makes it easier to trace any sealing failure as liquid will leak only from the side of the fitting with an o-ring failure and not from an interpipe area in addition to the seal around the exterior of the pipe.

Test and trouble-shoot after a pipe project is constructed results in quicker break-down, inspection and re-assembly than can be achieved for the "prior seal and coupling system". This translates into long-term savings for maintenance and the need to change service use through replacement of the pipe, connectors, or both. Further, the lightweight quick connector system can have different types and sizes of ends that form adapters by providing two sides that allow transition from a grooved pipe connection on one side to another side having a different size and/or type of connector, such as a flange connection, or different sized grooved pipe, or a threaded connector, to name a few. This "adapterization" will enable a few number of adapters to be kept for different types of installations and which will cut the labor time for transition from one type of connection service to another.

Where the lightweight quick connector system is used with flexible piping, even the need for having exact lengths of grooved pipe is relaxed to further facilitate the ability for manual assembly of a complete piping run with a need for tools at all only possibly at the terminal end of the run. The positive and secure nature of the interconnection system includes the use of a groove engagement locking clip which may preferably be made of music wire and that may preferably have a rectangular or a square profile to reliably resist grooved pipe being dislodged from engagement with the quick connector body. The groove engagement locking clip is also set to springingly resist opening and uses its spring force to engage the groove adjacent an end of a grooved pipe and through a pair of slots formed in the body. Groove engagement clip may preferably be produced from rectangular or square wire and is preferably at least double the depth of the pipe groove with which it interfits, so that, for example ½ of the Groove engagement clip width may occupy the pipe groove and so that for example ½ of the Groove engagement clip width extends out of the pipe groove to an extent of occupying the space above the pipe groove so that it will achieve a high strength lock with the slots of quick connector female socket to lock the grooved pipe into the quick connector. Engagement and the ability to engage the clip through the pair of slots and onto the groove in the grooved pipe can provide positive visual proof that the grooved end of the grooved pipe is properly inserted into the bore of the side of the body into which the grooved pipe is placed sufficient for the o-ring within an internally disposed groove in the body to engage and seal the exterior end of the grooved pipe. When the pipe is seated with respect to the female coupling member "socket" the start of the groove on the grooved pipe is exposed within the split or slot to allow the grooved pipe retaining, groove engagement clip to retain the grooved pipe in place in a sealed condition with respect to the quick connector.

Thus, the making of a joint includes grooved pipe insertion into the body of the quick connector to the extent of seating, securing a grooved pipe retaining groove engagement clip into the engagement clip slots, visually verifying that the clip is seated, to thus complete sealed connection of the pipe with the quick connector body. Breaking down a join involves simply removal of the clip followed by removal of the pipe from the body side from which it was previously inserted.

DESCRIPTION OF THE PREFERRED EMBODIMENTS

Figure 1:
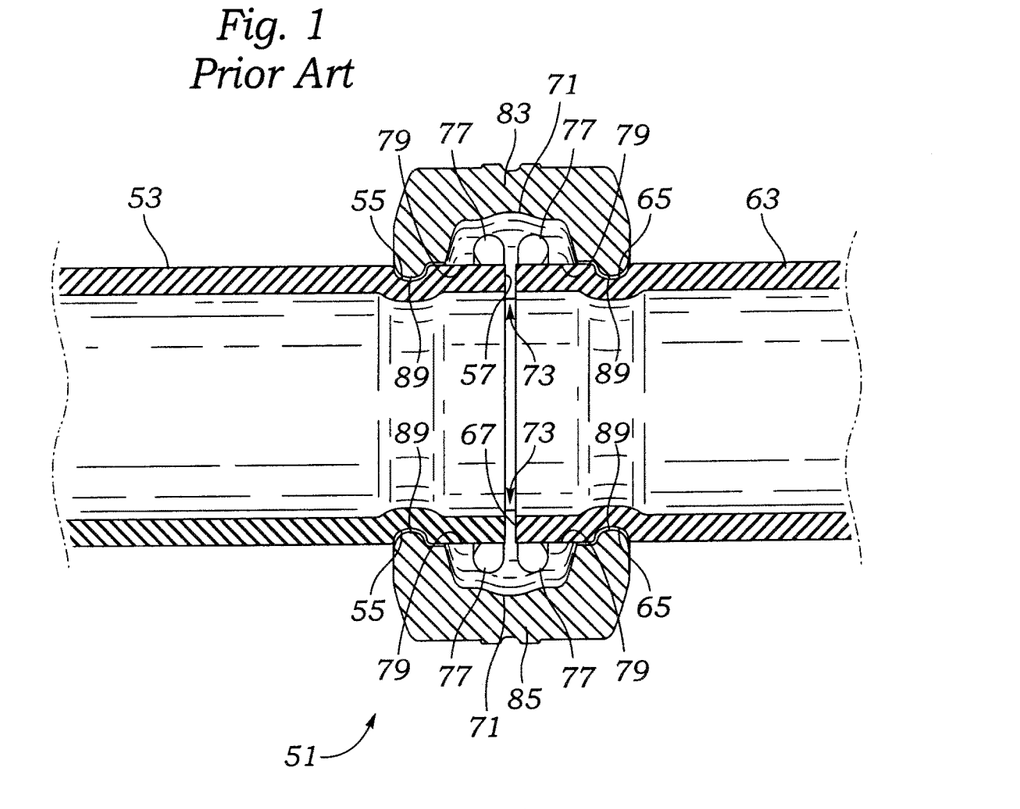
FIG. 1 is a side sectional view of one example of a prior art seal and coupling system to illustrate sealing in two directions.

Referring to FIG. 1, a side sectional view of one example of a conventional "prior seal and coupling system" 51 is shown. A first grooved pipe 53 includes a groove 55 spaced apart from a butt end 57 and is seen approaching from the left side of FIG. 1. A second grooved pipe 63 includes a groove 65 spaced apart from a butt end 67 and is seen approaching from the right side of FIG. 1. A polymeric seal 71 has a somewhat "M" shaped cross section with a middle internally directed land 73 which extends into a separated space between the butt end surfaces 57 and 67 as the first and second grooved pipes 53 and 63 are urged together.

Polymeric seal 71 includes a pair of gap spaces 77 separating the internally directed land 73 from a pair of exterior pipe engaging seal portions 79, possibly used to make the engagement more independent which may lead to sealing problems. A covering seal compressing and pipe groove engaging coupler is seen as having an upper coupler member 83 and a lower coupler member 85 that have rim portions 89 which are seen engaging grooves 55 and 65. The upper and lower coupler members 83 and 85 may be urged together by bolt engaging ears including one set that would be behind the structures in FIG. 1 and another set that would be not seen as removed in order to show the sectional view.

Figure 2:
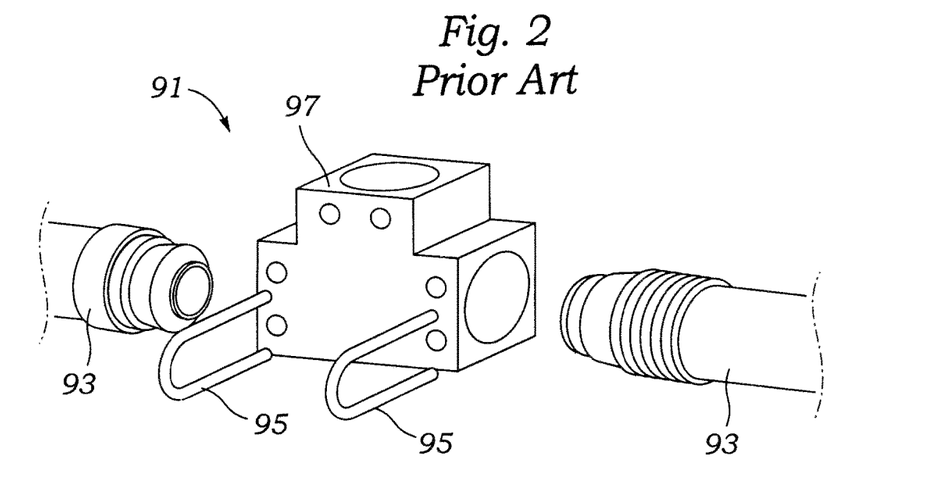
FIG. 2 is a perspective view of a hydraulic connector and fittings and utilizing straight pins inserted into a termination block.

FIG. 1 is helpful in illustrating the environment of grooved pipe sections 53 and 63 and the problems associated with joint makeup. Both pipe sections 53 and 63 have to be supported and aligned, and seal failure can occur where the middle internally directed land 73 is damaged, bent or folded or where one pipe section is pushed so far that it fails to seal. Further, the sealing pressure generally must be applied evenly to both sides so that the polymeric seal 71 will not be urged out of a side of the pipe sections 53 and 63 that has pressure more loosely applied. Referring to FIG. 2, a perspective view of a hydraulic connector 91 for accepting fittings 93 secured by straight pin sets 95 into a heavy termination block 97 is illustrated.

Figure 3:
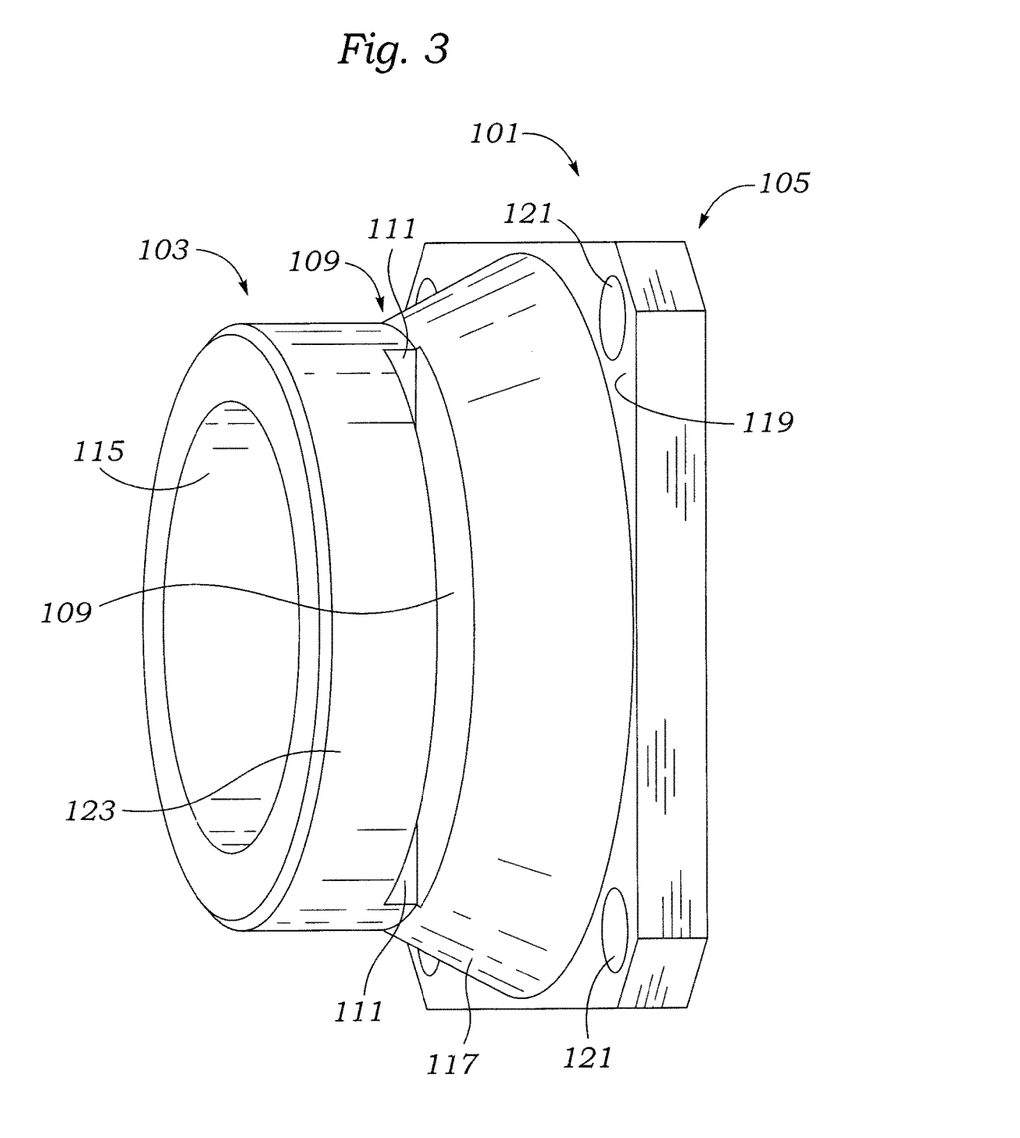
FIG. 3 is a side view of a first embodiment of a lightweight quick connector with one side having a grooved pipe receiving structure and an opposite side having a flange for bolted attachment.

Referring to FIG. 3, a side view of a first embodiment of a lightweight quick connector 101 is shown with one side having a grooved pipe receiving structure 103 and an opposite side having a flange 105 for bolted attachment to another structure. The quick connector 101 grooved pipe receiving structure 103 is seen to have a slot 109 that may be formed with a tangential cut through the material making up the grooved pipe receiving structure 103 and which may form exposed surfaces 111 of the material making up the grooved pipe receiving structure 103. Material behind exposed surfaces 111, which is not removed in the forming of the slots 109, regardless of how slots 109 are formed, represents the material which will determine the axial holding strength of the slots 109.

The slot 109 extends deeply enough into the material of grooved pipe receiving structure 103 that it cuts through and removes portions of the internal surface 115 of the quick connector 101. An opposite slot 109, not directly seen in FIG. 3 preferably mirrors the slot 109 seen in FIG. 2. Once the slots 109 are formed, the remaining connective material will determine the strength of the quick connector 101 to keep an inserted grooved pipe 53 in a made-up, locked position. The strength of the resulting quick connector 101 will therefore also be determined by the choice of materials, in addition to the area of material not removed for the slots 109.

A transitional frusto-conical surface 117 is seen from the slot 108 to a surface 119 of flange 105. The surface 119 of flange 105 is seen as having bolt apertures 121 at its corners. The thickness of the flange 105 may contain structures to limit insertion of a grooved pipe 53 past the limit of the flange 105, particularly to indicate that the grooved pipe 53 is seated. Flange 105 need have no internals other than its physical connection and some opening for enabling flow to pass through the flange 105. The dimensions and thickness of the quick connector 101 will depend upon the size of the grooved pipe 53, the magnitude of the pressure service for which the grooved pipe 53 and quick connector 101 will be employed, as well as the materials from which the grooved pipe 53 and quick connector 101 are constructed. An outer surface 123 of the grooved pipe receiving structure 103 is also seen.

Figure 4:
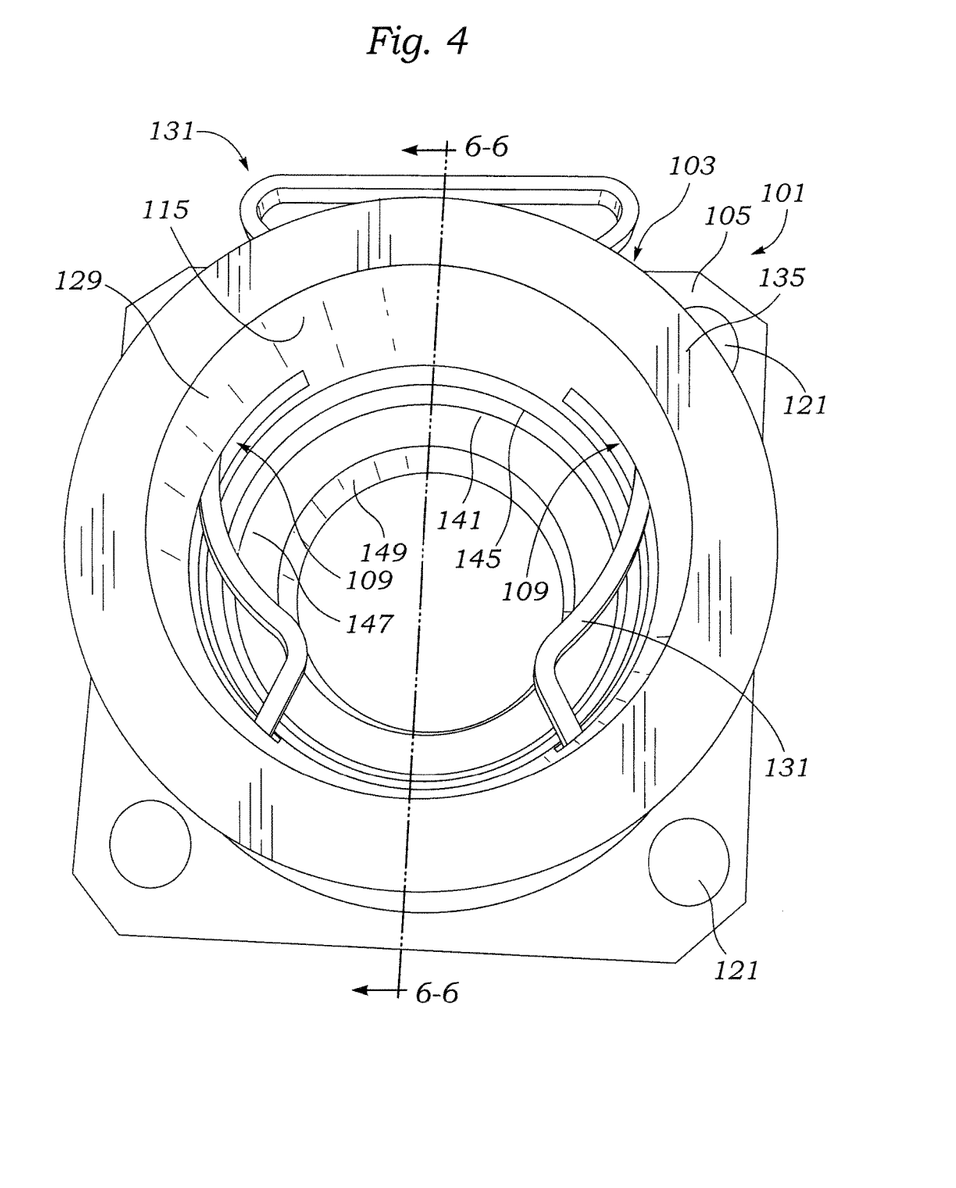
FIG. 4 is an end view, looking into the grooved pipe receiving structure side of the lightweight quick connector of FIG. 3 and shown with a groove engagement clip shown resting loosely within the side slots seen in FIG. 3.

Referring to FIG. 4, an end view, looking into the grooved pipe receiving structure 103 side of the lightweight quick connector 101 illustrates further details within a bore 129. Also seen within bore 129 is a partial view of a grooved pipe retaining, groove 55 engagement clip 131. Engagement clip 131 is seen partially inserted over and well cleared of contact with the upper exposed surface 111 seen in FIG. 3, and resting supported by the lower exposed surface 111 seen in FIG. 3. Groove 55 engagement clip 131 may preferably be hi-strength spring steel. metal injection molding (mim) and have 258,469 PSI tensile strength, and may be plated to prevent environmental corrosion. Groove 55 engagement clip 131 may also have a break that exceeds 6,375 with a hardness of Rockwell C-43. Although the groove 55 engagement clip 131 is not engaged with a grooved pipe 53, and although it is shown in a vertically higher position than it would be when engaged with the grooved pipe 53, it does illustrate the extent to which the curved sides of the engagement clip 131 may lie withing the bore 129 through the slots 109.

Although the slots 109 were shown as having been simply formed on a vertical cut, such as by a saw, with material removal, the slots 109 could be formed radially with some shape variation of the clip 131 to accommodate a radial cut. In addition, the inside perimeter of the bore 129 interrupted by the slots 109 are seen to be from about 105 to about 115 degrees each, leaving from about 65 to 75 degrees for each area not interrupted for the slots 109 (which were seen FIG. 3 as associated with the material of and behind exposed surface 111.

Thus, of the connected perimeter within the bore 129 is from about 35 to about 42 percent. Of course, the vertically formed slots 109 leave less connection material than would be the case for a radial formation of the slot 109. However, as previously stated, the axial holding strength of the resulting lightweight quick connector 101 depends more upon materials of construction, and the gross minimum area of material connection of each area not interrupted for the slots 109 which is associated with the material behind and between exposed surfaces 111. A difference between the diameter of the bore 129 and the outer diameter of the grooved pipe receiving structure 103 generally measured at the outer surface 123 and across an end surface 135 will also contribute to the gross minimum area of material connection of each area not interrupted for the slots 109. The choice of vertical slots 109 is for the purpose of making the formation of the slots easier quicker, and less expensive. Different shapes for slots 109 might also dictate a slightly different shaped groove 55 engagement clip 131.

From the end surface 135 and in a direction axially across a length of the bore 129 and then across the slots 109, an o-ring 141 is seen supported within an o-ring groove 145, of which an edge can be seen adjacent the o-ring 141. The o-ring 141 can be made or any material, including but not limited to acrylonitrile-Butadiene, aegis, aflas, Buna-N, chemraz, chloroprene, EPDM, ethylene Propylene, ethylene Acrylic, ethylene Propylene, ethylene acrylate, fluorosilicone, flurocarbon, Kalrez, Neoprene, Nitrile, Parofluor, Polyacrylate, Polyurethane, Silicone, Teflon Encapsulated, Teflon, and Viton to name a few. Selection of o-ring 141 will depend upon the pressure and type of fluid service to which the lightweight quick connector 101 is put.

Beyond the o-ring 141 an optional stop land 147 is seen as a reduced diameter opening which acts as a stop to the extent of travel of an inserted grooved pipe 53 so that it will not continue through the flange 105. Stop land 147 also defined a flow opening 149 having an abbreviated axial surface through the flange 105. The material from which the lightweight quick connector 101 is made includes and is not limited to any metal, alloyed steel, CPVC and PEX PEX XLPE or high density polyethylene to name a few. The material used will have a strength associated with it and will set the material thicknesses. The length of the grooved pipe receiving structure 103 will be chosen with respect to the material of construction to provide angular support and resistance to damage due to such angular support. It is understood that optional stop land 147 can be omitted, and the slot 109 can be made narrow enough to axially register the groove 55 and the first grooved pipe 53. In this case a worker may have to more carefully insert the first grooved pipe 53 into the grooved pipe receiving structure 103 and visually register the groove 55 with respect to the slot 109, and this may add a few seconds to the construction process.

Figure 5:
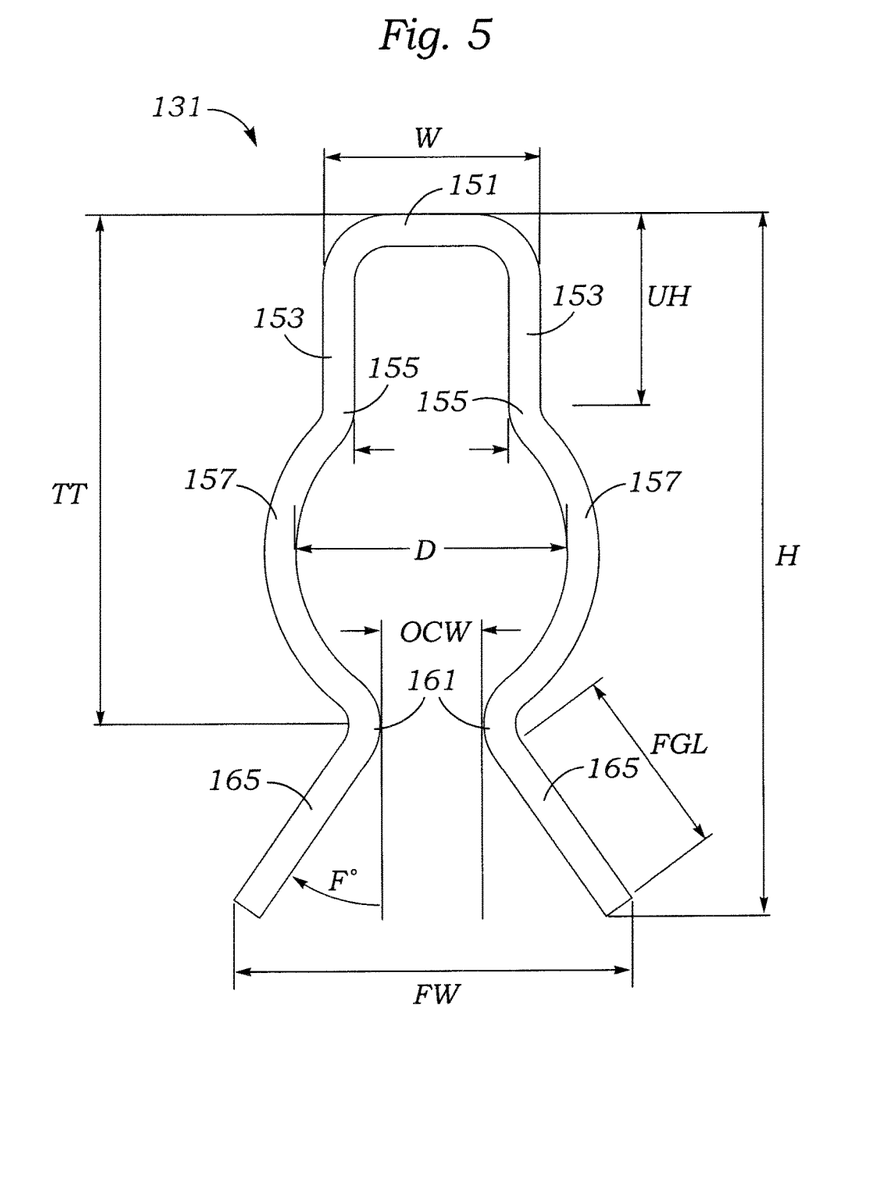
FIG. 5 is a plan view of the groove engagement clip seen in FIG. 4, and having a number of marked dimensions in order to show typical dimensions for some standard pipe sizes.

Referring to FIG. 5 an isolated plan view of the groove 55 engagement clip 131 is seen. Just as different diameter grooved pipe 53 will dictate a different set of overall sizes for the lightweight quick connector 101, the different sizes of groove 55 associated with each size of grooved pipe 53 will dictate different sizes and shapes of groove engagement clip 131. Dimensions seen in FIG. 5 will include overall height H, distance from top to the midpoint of turn of the angled legs TT, upper heigh UH, width W, midline diameter D, opening guide flair angle F, and flair guide length FGL, flair width FW and out turn curve width OCW.

The groove 55 engagement clip 131 may have differences in a variety of shaped portions with the more important attributes being portions that are for occupying a significant circumferential portion of the groove 55, and an open flaring portion to help guide the clip 131 onto the quick connector 101 and groove 55. A midline connector member 151 is high enough to facilitate manual engagement for pushing the engagement clip 131 onto and pulling it from engagement with the quick connector 101 when the grooved pipe 53 it inserted into it so as to expose groove 55 within the slot 109. From the midline connector member 151, a pair of generally mirror image extensions are seen. A pair of extensions 153 help to form an opening with A midline connector member 151 to enable finger or thumb grasping of the engagement clip 131, and help to set the overall clip spring tension. It is understood that extension members 153 and midline connector member 151 can be replaced by any members that are permissible or desired and that can supply a structure for grasping and provide inwardly urged spring tension.

A pair of curved transition sections 155 set the beginning of a transition from extension members 153 to a pair of curved section members 157 that each have an inside curvature of diameter D which will engage a significant circumferential portion of the groove 55 of the grooved pipe 53. The portions of curved sections must enter and engage the groove 55 through the slots 109, which as noted earlier take up from about 105 to about 115 degrees of the circumference of the bore 129 each. However note that part of the curvature inside the slot 109 is involved with entry and orientation of the curved section members 157 and that the actual amount the radius of each of the curved section members 157 which will lie wholly against the groove 55 may be from about 95 to about 110 degrees each, with some additional measure of radius still contributing to the locking action that the engagement clip 131 provides between the groove 55 and the slot 109.

At the end of the curved section members 157 most distal to the midline connector member 151, a second pair of curved transition members 161 turn the extent of the engagement clip 131 outward to enable the lower portion of the engagement clip 131 to emerge from the slot 109. From the second pair of curved transition section members 161 a pair of possibly curved or straight section members 165 flair outward. The flaring sections 165 help the user providing some assisted opening of the clip 131 when the clip is begun to be attached to the quick connector 101 by enabling a user to push directly onto the quick connector 101 and without having to otherwise directly urge portions the clip 131 sections springingly open with respect to each other.

Referring below to Table I, a series of dimensions of the clip 131 keyed to the legend of FIG. 5 is seen. Just as different diameter grooved pipe 53 will dictate a different set of overall sizes for the lightweight quick connector 101, the different sizes of groove 55 associated with each size of grooved pipe 53 will dictate different sizes of groove engagement clip 131. The goal is to have adequate axial holding within the quick connector 101 with enough of the clip 131 well supported within the groove 55 and extending outwardly of the groove 55 and into the slot 109 to securely make a secure connection. It is understood that many of the dimensions shown in Table I can be varied although it is generally desired to set an orientation that balances as much curved length of pair of curved section members 157 as possible without reducing the cross sectional area not occupied by the slots 109 and generally between the exposed surfaces 111 in order provide plenty of strength of the grooved pipe receiving structure 103 given the materials of construction of the quick connector 101.

TABLE I

CLIP DIMENSIONS IN INCHES
UNLESS OTHERWISE INDICATED

| SIZE | 1 Inch | 1.5 Inch | 2.0 Inch | 2.5 Inch | 3.0 Inch |
|---|---|---|---|---|---|
| H | 2.763 | 3.486 | 4.005 | 4.898 | 5.603 |
| TT | 2.01 | 2.702 | 3.23 | 3.845 | 4.550 |
| UH | 0.75 | 1.00 | 1.25 | 1.50 | 1.50 |
| W | 0.875 | 1.25 | 1.650 | 2.124 | 2.249 |
| D | 1.094 | 1.652 | 2.103 | 2.545 | 3.119 |
| F | 36.0 deg | 26.0 deg | 30.0 deg | 30.0 deg | 30.0 deg |
| FGL | 0.75 | 0.75 | 0.75 | 1.00 | 1.00 |
| FW | 1.585 | 1.680 | 2.134 | 2.924 | 3.044 |
| OCW | 0.40 | 0.75 | 1.10 | 1.50 | 1.62 |
| Wire | 0.156 | 0.125 | 0.125 | 0.187 | 0.187 |

Figure 6:
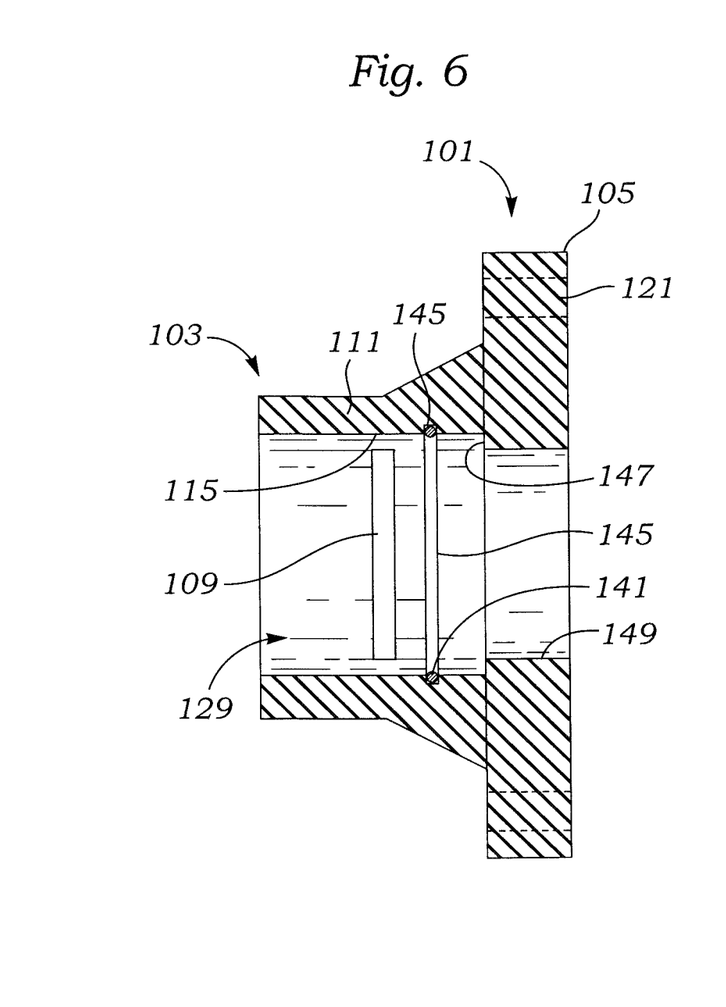
FIG. 6 is a cross sectional view taken along line 6-6 of FIG. 4 and to facilitate a comparison with subsequently shown embodiments.

Referring to FIG. 6, a cross sectional view taken along line 6-6 of FIG. 4 is illustrated and is introduced both to illustrate further details of the interior of the quick connector 101 and also to serve as a point of reference to best illustrate variations of further embodiments in later Figures. The basic elements of the grooved pipe 53 receiving structure 103 of sufficient support and axial length to help support grooved pipe 53, some portion of the bore 129 and internal surface 115 to guide and engage the grooved pipe 53, slot 109 to facilitate engagement access of the groove 55 engagement clip 131 to the groove 55 of a grooved pipe 53 when it is fully inserted through the grooved pipe receiving structure 103, perhaps limited only by engagement of butt end 57 of the first grooved pipe 53 against a stop land 147 or some other interfering structure, and an o-ring 141, within o-ring groove 145, for engagement with an external section of the first grooved pipe 53 between its butt end 57 and groove 55. In FIGS. 2,3, & 5 the flange 105 represents material extended away from the axis of flow only for the purpose of attachment to a structure. The quick connector 101 structure should be able to withstand a pressure of 2000 PSI and take around 7 to 10 SECONDS to assemble to complete a connection.

Figure 7:
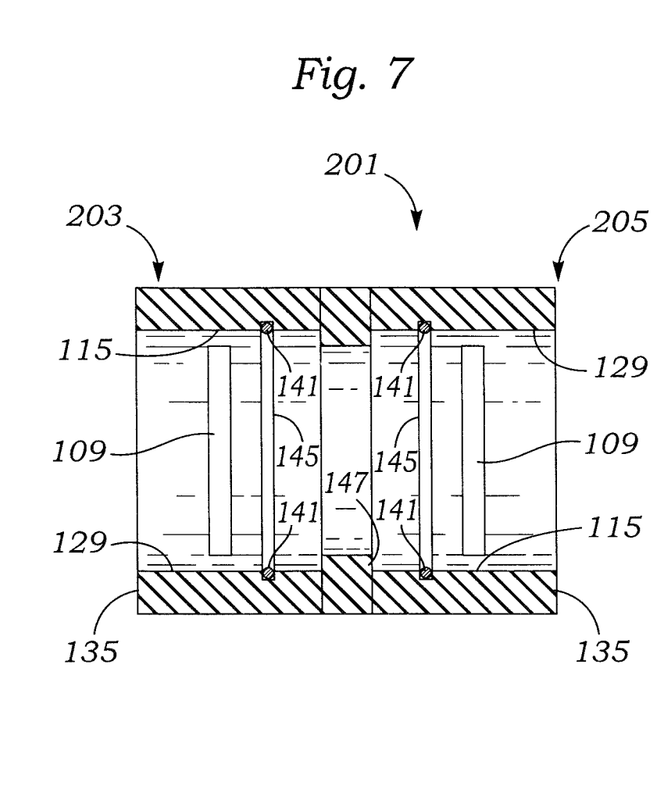
FIG. 7 is a second embodiment of a lightweight quick connector seen as a double female quick connector which can be constructed with different sizes of grooved pipe receiving structure to accommodate different diameter grooved pipe to facilitate the flow transition from one size of grooved pipe to another without the need for a heavier more custom set of transition structures.

Referring to FIG. 7, a second embodiment of a lightweight quick connector is seen as a double female quick connector 201. The numbering convention used for lightweight quick connector 101 will be preserved for all subsequently shown embodiments except for changed or to differentiate duplicated structures as needed for clarity. Double female quick connector 201 includes a first grooved pipe receiving structure 203 which may be integrally formed with a second grooved pipe receiving structure 205.

Both the first and second grooved pipe receiving structure 203 and 205 include an end surface 135, bore 129, internal surface 115, slot 109, o-ring groove 145, o-ring 141, stop land 147 and a flow opening 149. It may be preferable that the stop lands 147 match an internal diameter of the grooved pipe 53 to prevent pressure drop due to a change in flow cross sectional area and direction. The stop land 147 may ideally form the center of the double female quick connector 201.

Note that although the first and second grooved pipe receiving structure 203 and 205 are shown has having the same internal and external diameters and axial lengths, the elements associated with the first grooved pipe receiving structure 203 need not be the same length, diameter, and width as the structures associated with the second grooved pipe receiving structure 205. In this manner, the double female quick connector 201 can facilitate the flow transition from one size of grooved pipe 53 to another, and it can do so without the need for a heavy set of transition structures. This can be useful in a factor setting where a large run of large diameter grooved pipe 53 is provided for later use as a feeder pipe, but where the piping beyond a given point in the run will only need to be a smaller diameter of pipe. As an example, with the prior seal and coupling system 51 a pair of coupler members 83 & 85 cannot effectively change diameters, especially due to the lack of even, two-sided pressure on the middle internally directed land 73 of the polymeric seal 71.

Figure 8:
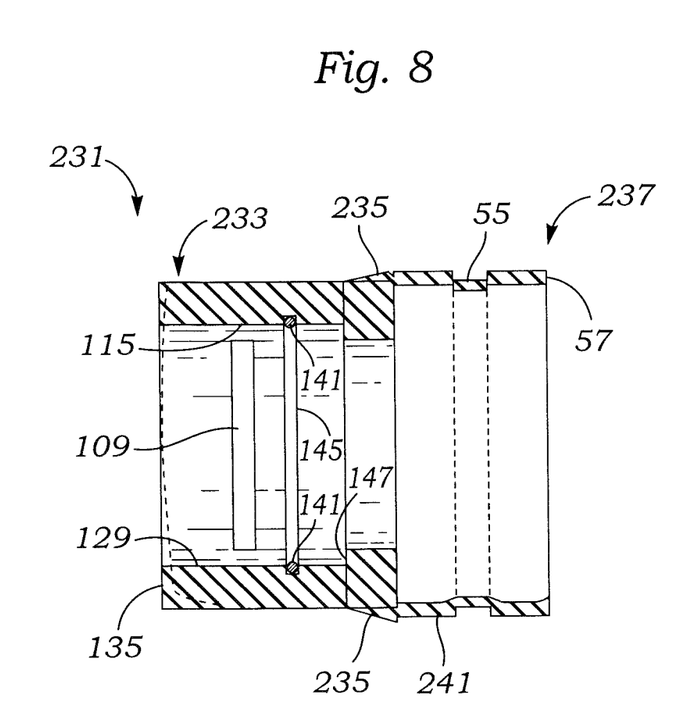
FIG. 8 is a third embodiment of a lightweight quick connector seen as a female-male pipe size transition quick connector that includes grooved pipe receiving structure attached to an abbreviated length grooved pipe structure.

Referring to FIG. 8, a third embodiment of a lightweight quick connector is seen as a male-female pipe size transition quick connector 231. Size transition quick connector 231 has a left side that includes a grooved pipe receiving structure 233. The stop land 147 is also provided, but has a frusto-conical transition member 235 that is either attached or integral to a grooved pipe structure 237 that is an abbreviated length of pipe that is shown as having a larger diameter than the diameter of grooved pipe 53 that would otherwise fit into bore 129. Grooved pipe structure 237, other than its being attached to the grooved pipe receiving structure 233 has the same grooved pipe end elements seen in FIG. 1, including a short segment grooved pipe 241, groove 55 and butt end 57. Thus, either the double female quick connector 201 or the a male-female pipe size transition quick connector 231 can be used to enable a pipe run to transition from one size to another.

Figure 9:
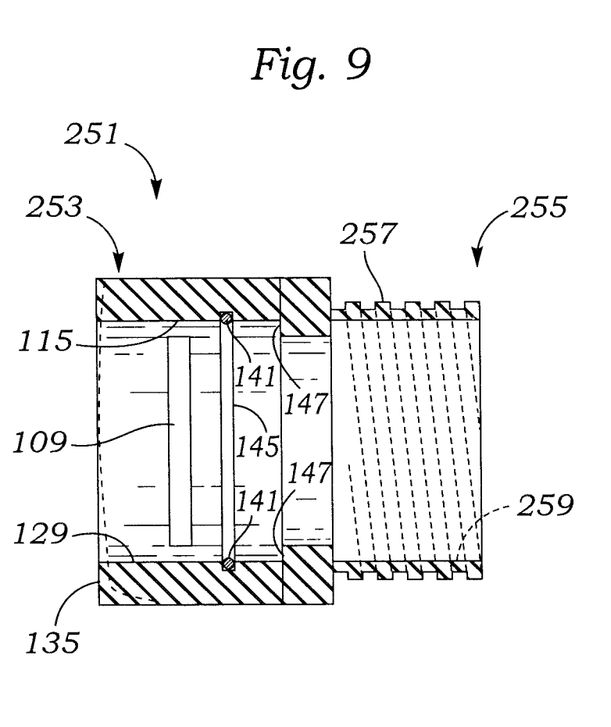
FIG. 9 is a fourth embodiment of a lightweight quick connector is seen as a female-male threaded pipe adapter quick connector that includes grooved pipe receiving structure attached to an abbreviated length male threaded pipe structure.

Referring to FIG. 9, a fourth embodiment of a lightweight quick connector is seen as a female-threaded pipe adapter quick connector 251. Adapter quick connector 251 has a left side that includes a grooved pipe receiving structure 253. The stop land 147 is also provided. To further show the possibilities of size difference a threaded pipe member 255 is shown attached to the grooved pipe receiving structure 253 adjacent the stop land but is sized to be radially smaller in diameter than structures on the left side. Threaded Pipe member 255 includes threads 257 that can be of any type, depth and pitch necessary for interconnection. Threaded Pipe member 255 has an internal bore 259.

Figure 10:
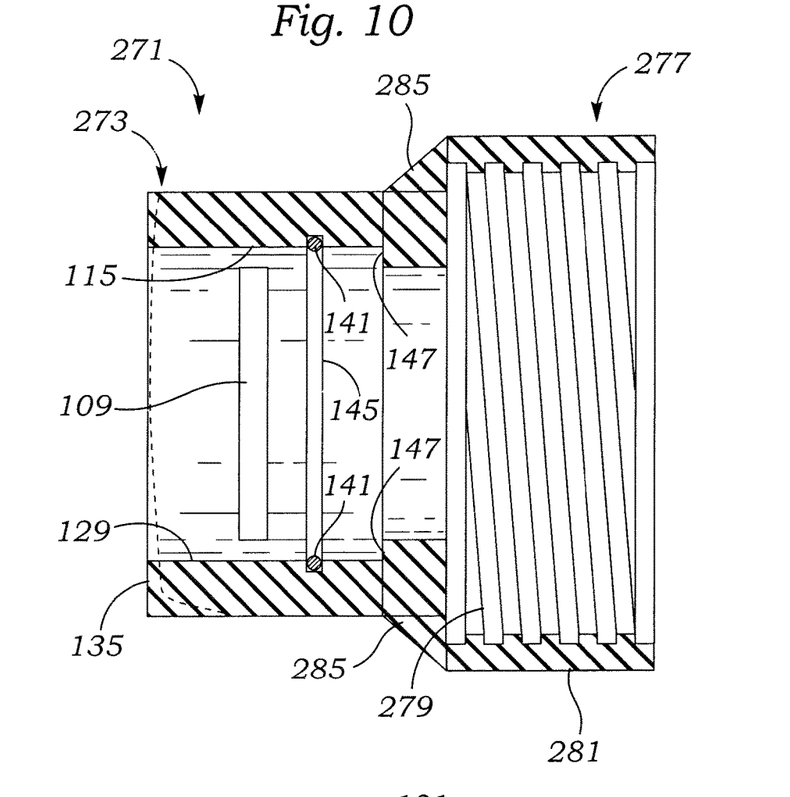
FIG. 10 is a fifth embodiment of a lightweight quick connector is seen as a female-female threaded pipe adapter quick connector that includes grooved pipe receiving structure attached to an abbreviated length female threaded pipe structure.

Referring to FIG. 10, a fifth embodiment of a lightweight quick connector is seen as a female-female threaded pipe adapter quick connector 271 that includes grooved pipe receiving structure 273 attached to an abbreviated length female threaded pipe structure 277. The stop land 147 is also provided. To further show the possibilities of size difference, the female threaded pipe structure 277 is shown attached to the grooved pipe receiving structure 273 adjacent the stop land 147 but is sized to be radially larger in diameter than structures on the left side. Female threaded pipe structure 277 includes internal threads 279 that can be of any type, depth and pitch necessary for interconnection. Female threaded pipe structure 277 has a cylindrical outer surface 281 has a diameter that is of significantly greater than the diameter of the grooved pipe receiving structure 273, and includes a frusto-conical transition member 285 to transition between the two. One feature of all of the grooved pipe receiving structure 103, 203, 233, 253 & 273 seen in FIGS. 3-11 is that it allows turning adjustment of the quick connectors 101, 201, 231, 251, & 271 while engaged to a grooved pipe 53. This feature may be advantageous for installation or pressure testing or leak troubleshooting.

Figure 11:
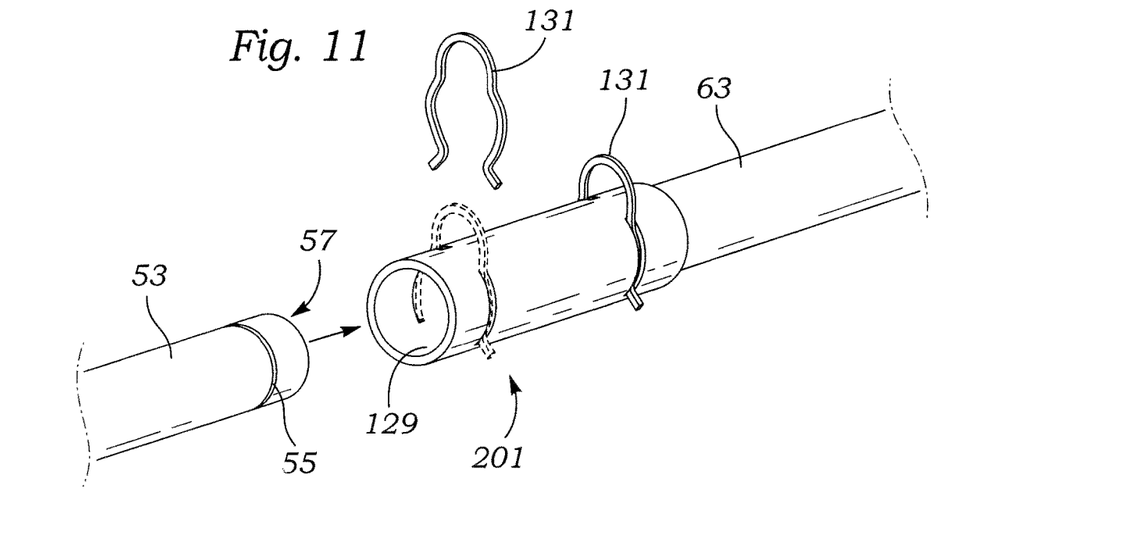
FIG. 11 is a perspective model illustrating pipe insertion and connection in the embodiment of FIG. 7.

Referring to FIG. 11, a perspective view of the double female quick connector 201 illustrates a part of the attachment process. Double female quick connector 201 is shown as being attached to second grooved pipe 63 with groove 55 engagement clip 131 attached to the double female quick connector 201 and groove 65 (not seen in FIG. 11) of second grooved pipe 63. To the left of double female quick connector 201 the first grooved pipe 53 is shown on approach to the bore 129 while the with groove 55 engagement clip 131 is shown over the assembly waiting to be clipped into the slot 109 once first grooved pipe 53 is inserted far enough in its side of the double female quick connector 201 to enable groove 55 to present itself within the slot 109 and be engageable by the clip 131.

While the present invention has been described in terms of a quick connector structure and system used in conjunction with grooved piping, and in which both the grooved piping and quick connector structure may be made from a wide variety of materials, one skilled in the art will realize that the structure and techniques of the present invention can be applied to many appliances and systems. The present invention may be applied in any situation where conduit and piping is desired to be constructed in a precise manner at greater speed and with greater savings.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A quick connector for fluid conduit comprising:
a first grooved pipe receiving structure having at least a first cylindrical exterior surface, a first bore having an first internal surface interrupted by a first slot for providing radial access to the bore from outside the pipe receiving structure, a second slot for providing radial access to the bore from outside the pipe receiving structure, the first slot opposite the second slot, and the first and second slots formed at least partially through the at least a first cylindrical exterior surface, the first bore having a first internal circumferentially inwardly directed o-ring support groove axially spaced apart from the first and second slots to enable sealing against a first generally externally cylindrical grooved pipe to occur between a first groove of the first generally externally cylindrical grooved pipe and an end of the first generally externally cylindrical grooved pipe;
a first engageable and removable grooved pipe retaining groove engagement clip including
a connector and extension member having a pair of ends;
a pair of opposing curved section members each having an inner curve diameter substantially following the diameter of the first bore and for engaging a groove of an inserted grooved pipe to a locked position within the first grooved pipe receiving structure, and an outer curve diameter substantially following the first cylindrical exterior surface of the first grooved pipe receiving structure, each of the pair of curved section members having a first end connected to an associated one of the pair of ends of the connector and extension member, and each of the pair of curved section members having a second end, each of the pair of curved section members extending from about 105 to about 115 degrees of circumference of the diameter of the first bore; and
a pair of straight section members each having a first end connected to an associated one of the second ends of the pair of curved section members, and each of the pair of straight section members having a second end, the pair of straight section members;
the first grooved pipe retaining groove engagement clip having a rectangular cross section to better resist any grooved pipe from being dislodged from engagement with the first grooved pipe receiving structure, the outer curve diameter achieving a first visually noticeable position with respect to the first cylindrical exterior surface of the first grooved pipe receiving structure if in a locked position and for achieving a second visually noticeable position with respect to the first cylindrical exterior surface of the first grooved pipe receiving structure if in an un-locked position; and
a structure adjacent the first generally externally cylindrical grooved pipe receiving structure to facilitate structural attachment of the quick connector to another structure and fluid flow connection between the first grooved pipe receiving structure and the other structure and wherein the structure adjacent the first grooved pipe receiving structure is a flange having apertures to facilitate bolted attachment.

* * * * *